(12) United States Patent
Yamagishi et al.

(10) Patent No.: US 8,816,030 B2
(45) Date of Patent: Aug. 26, 2014

(54) CHLOROPRENE RUBBER, CHLOROPRENE RUBBER COMPOSITION, VULCANIZATE THEREOF, AND FORMED BODY

(75) Inventors: Uichiro Yamagishi, Itoigawa (JP);
Takashi Tachiyama, Itoigawa (JP);
Takahiro Kozuka, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/114,899

(22) PCT Filed: Feb. 7, 2012

(86) PCT No.: PCT/JP2012/052730
§ 371 (c)(1),
(2), (4) Date: Oct. 30, 2013

(87) PCT Pub. No.: WO2012/153551
PCT Pub. Date: Nov. 15, 2012

(65) Prior Publication Data
US 2014/0058055 A1 Feb. 27, 2014

(30) Foreign Application Priority Data

May 9, 2011 (JP) .................................. 2011-104105

(51) Int. Cl.
*C08F 236/18* (2006.01)
*C08F 2/22* (2006.01)
*C08L 11/00* (2006.01)
*C08J 3/24* (2006.01)

(52) U.S. Cl.
CPC .............. *C08F 236/18* (2013.01); *C08L 11/00* (2013.01)
USPC ........... 526/294; 526/295; 524/552; 428/36.9

(58) Field of Classification Search
USPC .................... 526/294, 295; 525/330.8, 330.9; 524/552; 428/36.9
See application file for complete search history.

(56) References Cited

U.S. PATENT DOCUMENTS

| 3,988,506 A * | 10/1976 | Dohi et al. ................. 526/219.5 |
| 4,771,093 A | 9/1988 | Nakane et al. ................. 524/225 |
| 2002/0007011 A1 | 1/2002 | Konno et al. ................... 525/84 |
| 2004/0059060 A1 | 3/2004 | Chino et al. .................. 525/190 |
| 2012/0047674 A1* | 3/2012 | Dallos et al. ............... 15/250.48 |

FOREIGN PATENT DOCUMENTS

| JP | 59-71319 A | 4/1984 |
| JP | 61-179203 A | 8/1986 |
| JP | 2001-288217 A | 10/2001 |
| JP | 2001-343072 A | 12/2001 |
| JP | 2001-343091 A | 12/2001 |
| JP | 2002-12633 A | 1/2002 |
| JP | 3453386 B2 | 7/2003 |
| JP | 2004-269594 A | 9/2004 |
| JP | 2004-323572 A | 11/2004 |
| JP | 2004-323573 | 11/2004 |
| WO | WO 97/04024 A1 | 2/1997 |

OTHER PUBLICATIONS

CAPLUS Abstract AN 1984:572830 of JP 59-71319A (Apr. 1984).*
English language translation of JP 59-71319A; publication date: Apr. 23, 1984.*
International Search Report mailed Apr. 17, 2012, issued in corresponding International Patent Application No. PCT/JP2012/052730.

* cited by examiner

*Primary Examiner* — Fred M Teskin
(74) *Attorney, Agent, or Firm* — Stein IP, LLC

(57) ABSTRACT

Provided are a chloroprene rubber, a chloroprene rubber composition and the vulcanizate and formed body thereof superior in low-temperature properties.
A chloroprene rubber is obtained by emulsion polymerization of raw monomers containing antiperiplanar trans-1-chlorobuta-1,3-diene and cis-1-chlorobuta-1,3-diene in a total amount of 0.5 mass % or more, 2,3-dichlorobuta-1,3-diene in an amount of 2.0 mass % or more, and the rest being chloroprene. A composition containing the chloroprene is vulcanized into a formed body.

6 Claims, No Drawings

CHLOROPRENE RUBBER, CHLOROPRENE RUBBER COMPOSITION, VULCANIZATE THEREOF, AND FORMED BODY

CROSS-REFERENCE TO RELATED APPLICATIONS

This application is a national stage of International Application No. PCT/JP2012/052730, filed Feb. 7, 2012, which claims the benefit of Japanese Application No. 2011-104105, filed May 9, 2011, in the Japanese Patent Office. All disclosures of the document(s) named above are incorporated herein by reference.

BACKGROUND OF THE INVENTION

1. Field of the Invention

The present invention relates to a chloroprene rubber, a chloroprene rubber composition and the vulcanizate thereof and the formed body produced by using the same. More specifically, it relates to a chloroprene rubber used in rubber formed bodies such as wiper blades, boot members, and hose members.

2. Description of the Related Art

Chloroprene rubbers, which are superior in heat resistance, weather resistance, ozone resistance, and chemical resistance, have been used in various fields for example for production of general industrial rubber products, automobile parts and adhesive agents. Such chloroprene rubber formed bodies are produced generally by forming a chloroprene rubber composition containing chloroprene rubber and additionally a vulcanizing agent, a vulcanization accelerator, a filler, and others into a particular shape and vulcanizing the formed body.

On the other hand, chloroprene rubbers have a problem that they are lower in low-temperature properties, in particular in compression set and dynamic properties at low temperature. Thus, chloroprene rubber compositions containing a particular softening agent for improvement of the low-temperature resistance were proposed (see, for example, Patent Documents 1 to 3).

CITATION LIST

Patent Literatures

[Patent Document 1] Japanese Unexamined Patent Application Publication No. 2004-269594
[Patent Document 2] Japanese Unexamined Patent Application Publication No. 2004-323572
[Patent Document 3] Japanese Unexamined Patent Application Publication No. 2004-323573

SUMMARY OF THE INVENTION

Technical Problem

However, the traditional technologies described above are improvement methods by modification of the blending technology. In the case of these methods, if the softening agent is added in an increased amount for further improvement of the low-temperature properties, it resulted in bleeding of the softening agent out of the surface during forming, leading to deterioration in adhesiveness between the chloroprene rubber composition and the mold. Thus, needed is not modification of the blending composition but improvement of the low-temperature properties of the chloroprene rubber (polymer) itself.

Accordingly, the main object of the present invention is to provide a chloroprene rubber superior in low-temperature properties, a chloroprene rubber composition containing the same, and the vulcanizate and the formed body thereof.

Solution to Problem

After intensive studies on 1-chlorobuta-1,3-diene, one of the raw monomers, having influence on the low-temperature properties of chloroprene conducted to overcome the problems above, the inventors have obtained the following findings: 1-Chlorobuta-1,3-diene has isomers such as antiperiplanar trans-1-chlorobuta-1,3-diene, synperiplanar trans-1-chlorobuta-1,3-diene, and cis-1-chlorobuta-1,3-diene. The inventors have found that, in particular, antiperiplanar trans-1-chlorobuta-1,3-diene and cis-1-chlorobuta-1,3-diene among these isomers improve the crystallization resistance and the low-temperature properties of the chioroprene efficiently and made the present invention.

Accordingly, the chloroprene rubber according to the present invention is a product obtained by emulsion polymerization of raw monomers containing antiperiplanar trans-1-chlorobuta-1,3-diene and cis-1-chlorobuta-1,3-diene in a total amount of 0.5 mass % or more and, 2,3-dichlorobuta-1,3-diene in an amount of 2.0 mass % or more. In the present invention, as the raw monomers contain antiperiplanar trans-1-chlorobuta-1,3-diene, cis-1-chlorobuta-1,3-diene, and 2,3-dichlorobuta-1,3-diene respectively in particular amounts, the resulting chloroprene rubber has stabilized low-temperature properties.

The chloroprene rubber composition according to the present invention contains the chloroprene rubber described above.

The vulcanizate according to the present invention is prepared by vulcanization of the chloroprene rubber composition described above.

Further, the formed body according to the present invention is a product obtained by vulcanizing the chloroprene rubber composition described above after or during forming and examples thereof include boot members, hose members, bearing rubbers, sealing materials, wiper blades, and the like.

The chloroprene rubber according to the present invention is prepared by emulsion polymerization of raw monomers containing antiperiplanar trans-1-chlorobuta-1,3-diene and cis-1-chlorobuta-1,3-diene in a total amount of 0.5 mass % or more and 2,3-dichlorobuta-1,3-diene in an amount of 2.0 mass % or more.

Advantageous Effects of Invention

According to the present invention, as raw monomers containing antiperiplanar trans-1-chlorobuta-1,3-diene, cis-1-chlorobuta-1,3-diene, and 2,3-dichlorobuta-1,3-diene respectively in particular amounts are used in the emulsion polymerization, the vulcanizate and the formed body of the chloroprene rubber composition show low-temperature properties better than those of conventional chloroprene rubbers.

DETAILED DESCRIPTION OF THE EMBODIMENTS

Hereinafter, favorable embodiments of the invention will be described in detail, but it should be understood that the present invention is not restricted by the embodiments described below.

(First Embodiment)

The chloroprene rubber in a first embodiment of the present invention will be described first. The chloroprene rubber in the present embodiment is obtained by emulsion polymerization of raw monomers containing antiperiplanar trans-1-chlorobuta-1,3-diene and cis-1-chlorobuta-1,3-diene in a total amount of 0.5 mass % or more and 2,3-dichlorobuta-1,3-diene in an amount of 2.0 mass % or more.

The rest of the raw monomers (main component) is 2-chloro-1,3-butadiene (hereinafter, referred to as chloroprene) but the raw monomers may contain additionally other monomers polymerizable with chloroprene, such as styrene and the derivatives thereof and also acrylonitrile and methacrylates.

[1-Chlorobuta-1,3-diene: 0.5 Mass % or More]

Antiperiplanar trans-1-chlorobuta-1,3-diene represented by the following Chemical Formula 1 and cis-1-chlorobuta-1,3-diene represented by the following Chemical Formula 2 are produced as by-products when chloroprene is produced for example by acetylene method. If they are copolymerized with chloroprene, the resulting polymer shows improved low-temperature properties after vulcanization.

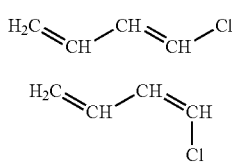

However, when antiperiplanar trans-1-chlorobuta-1,3-diene and cis-1-chlorobuta-1,3-diene are contained in a total amount of less than 0.5 mass % in the raw monomers, the resulting polymer shows less favorable low-temperature properties. Specifically, the polymer has lower compression set at low temperature.

The maximum content of antiperiplanar trans-1-chlorobuta-1,3-diene and cis-1-chlorobuta-1,3-diene in the raw monomers is not particularly limited, but preferably 5 mass % or less, from the viewpoint of stability during processing. The "stability during processing," as used herein, means that the polymer is stable for a sufficient period of time before vulcanization so that the polymer does not cause forming defects due to vulcanization during forming. It is generally a concept relevant to the scorch time.

[2,3-Dichlorobuta-1,3-diene: 2.0 Mass % or More]

2,3-Dichlorobuta-1,3-diene has an action to disturb the crystallinity of the chloroprene rubber and improve the low-temperature properties thereof after vulcanization. However when it is contained in an amount of less than 2.0 mass %, based on the total amount of monomers, it does not show a sufficiently high improving action. Thus in the chloroprene rubber of the present embodiment, the content of 2,3-dichlorobuta-1,3-diene in raw monomers is adjusted to 2.0 mass % or more.

Alternatively, the maximum content of 2,3-dichlorobuta-1,3-diene content in the raw monomers is not particularly limited, but preferably 20 mass % or less, based on the total amount of monomers, as it may lead to increase of the brittle temperature or deterioration of mechanical strength, if it is added in a greater amount.

[Production Method]

Hereinafter, the method for producing the chloroprene rubber of the present embodiment will be described. In the method for producing the chloroprene rubber of the present embodiment, raw monomers containing chloroprene as the main component are emulsion-polymerized. Then, the total content of antiperiplanar trans-1-chlorobuta-1,3-diene and cis-1-chlorobuta-1,3-diene in the raw monomers is adjusted to 0.5 mass % or more and the content of 2,3-dichlorobuta-1,3-diene to 2.0 mass % or more.

The method to adjusting the total content of antiperiplanar trans-1-chlorobuta-1,3-diene and cis-1-chlorobuta-1,3-diene in the raw monomers to 0.5 mass % or more is not particularly limited and, for example, chloroprenes containing antiperiplanar trans-1-chlorobuta-1,3-diene and cis-1-chlorobuta-1,3-diene in different amounts may be mixed with each other for adjustment of the total content. Alternatively, it is also possible to isolate antiperiplanar trans-1-chlorobuta-1,3-diene and cis-1-chlorobuta-1,3-diene from other isomers and add them to the raw monomers directly.

These monomers, 2,3-dichlorobuta-1,3-diene, antiperiplanar trans-1-chlorobuta-1,3-diene and cis-1-chlorobuta-1,3-diene, may be added all at once or in aliquots by multiple times. The method of the divided addition is not particularly limited and, for example, some of the monomers in particular amounts may be added when the polymerization is initiated and the other monomers may be added all at once or in aliquots by multiple times, when the chloroprene conversion rate is in a particular range.

The emulsifier/dispersant used in the emulsion polymerization may be an alkali-metal salt of common rosin acid. In particular, use of a sodium and/or potassium salt of disproportionated rosin acid is preferable, from the viewpoint of color stability.

In addition, a derivative of rosin acid in a structure other than alkali-metal salt may be used in combination as the emulsifier/dispersant, in the range that does not impair the advantageous effects of the invention. The emulsifiers/dispersants that can be used in combination with the rosin acid alkali-metal salt include carboxylate salts, sulfonate salts, sulfate ester salts and the like. Typical examples thereof include, but are not limited to, alkylsulfonates and alkylarylsulfonates having a carbon number of 8 to 20, condensates of sodium naphthalenesulfonate and formaldehyde, polyoxyethylene acyl ethers, polyoxyethylene alkyl phenols, sorbitan fatty acid esters, polyoxyethylene acyl esters and the like.

The polymerization initiator used in the emulsion polymerization is not particularly limited and those used in common chloroprene emulsion polymerization may be used. Typical examples thereof favorably used include persulfate salts such as potassium persulfate, organic peroxides such as tert-butyl hydroperoxide and the like.

The chain-transfer agent is also not particularly limited and those used in common chloroprene emulsion polymerization may be used. Specifically, known chain-transfer agents including long-chain-alkyl mercaptans such as n-dodecylmercaptan and tert-dodecylmercaptan, dialkyl xanthogen disulfides such as diisopropyl xanthogen disulfide and diethyl xanthogen disulfide, iodoform and the like can be used.

The polymerization temperature of the chloroprene latex is not particularly limited, if it is in the range in which emulsion polymerization is generally carried out, but the polymerization temperature is preferably 33 to 58° C. for improvement of low-temperature properties and productivity.

The polymerization terminator added for termination of the polymerization is not particularly limited and those commonly used may be used. Typical examples thereof for use include phenothiazine, para-t-butylcatechol, hydroquinone, hydroquinone monomethylether, diethylhydroxylamine and the like. The final polymerization rate of the chloroprene polymer obtained in the polymerization step described above (chloroprene rubber) is not particularly limited and may be adjusted to any value in the range of 0 to 100%. However, the final polymerization rate of the chloroprene polymer is preferably 30% or more, when the productivity is taken into consideration.

Subsequently, unreacted monomers are removed from the polymer solution obtained in the polymerization step (monomer removal). The method is not particularly limited and any known method, such as heating under reduced pressure, may be used.

As described above in detail, as 2,3-dichlorobuta-1,3-diene is contained in an amount of 2.0 mass % or more in the raw monomers, the chloroprene rubber of the present embodiment shows improved crystallinity. In addition, as the content of antiperiplanar trans-1-chlorobuta-1,3-diene and cis-1-chlorobuta-1,3-diene in the raw monomers is adjusted to 0.5 mass % or more, it is possible to improve the low-temperature properties efficiently and reliably. It is possible, as a result, to obtain a chloroprene rubber showing improved low-temperature properties efficiently and reliably.

(Second Embodiment)

Hereinafter, the chloroprene rubber composition in a second embodiment of the present invention will be described. The chloroprene rubber composition of the present embodiment contains, in addition to the chloroprene rubber described above, a vulcanizing agent, a vulcanization accelerator, a filler, a reinforcing agent, a softening agent, a plasticizer, a lubricant, an aging inhibitor, a stabilizer, a silane-coupling agent, an acid acceptor and the like.

The vulcanizing agents that can be added to the chloroprene rubber composition of the present embodiment include, for example, metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium, the oxides and hydroxides thereof, and the like. In particular among the metal compounds, calcium oxide, zinc oxide, antimony dioxide, antimony trioxide, and magnesium oxide are preferable, as they have stronger vulcanization action. These vulcanizing agents may be used alone or in combination of two or more.

The vulcanization accelerators for use include, for example, thiourea-based vulcanization accelerators, thiuram-based vulcanization accelerators, sulfenamide-based vulcanization accelerators, and the like. In particular among them, ethylene thiourea is preferable, as it is superior in processability and gives a vulcanizate that is superior in the balance of physical properties. These vulcanization accelerators may be used in combination of two or more.

The filler and the reinforcing agent blended to the chloroprene rubber composition of the present embodiment may be those commonly used in chloroprene rubber application, and typical examples thereof include carbon black, silica, clay, talc, calcium carbonate, and the like.

The plasticizer may also be a plasticizer commonly used in chloroprene rubber application and examples thereof include dioctyl phthalate, dioctyl adipate, and the like.

The aging inhibitor for use may be an aging inhibitor commonly used in chloroprene rubber application. Specifically, amine-based aging inhibitors, imidazole-based aging inhibitors, metal carbamate salts, phenol-based aging inhibitors, waxes, and the like may be used and they may be used alone or in combination. Particularly among these aging inhibitors, amine-based aging inhibitors, such as 4,4'-bis(α,α-dimethylbenzyl)diphenylamine and octylated diphenylamines, can improve the heat resistance of the formed body, if used.

The softening agent for use may be any softening agent commonly used in chloroprene rubber application. Specifically, lubricating oils, process oils, paraffins, liquid paraffins, vaselines, petroleum softening agents such as petroleum asphalts, vegetable oil-based softening agents such as rapeseed oils, flaxseed oils, castor oils, and coconut oils are usable and they may be used alone or in combination.

The chloroprene rubber composition of the present embodiment can be vulcanized into a vulcanizate by a known method such as press vulcanization, injection-molding vulcanization, steam pan vulcanization, UHF vulcanization, LCM vulcanization, or HFB vulcanization. The vulcanization temperature then can be adjusted properly according to the composition of the chloroprene rubber composition and the kind of the vulcanizing agent used, but it is normally, preferably in the range of 140 to 190° C., more preferably in the range of 150 to 180° C.

As described above in detail, the chloroprene rubber composition of the present embodiment, which uses a chloroprene rubber obtained by emulsion polymerization of raw monomers containing 2,3-dichlorobuta-1,3-diene in a particular amount and antiperiplanar trans-1-chlorobuta-1,3-diene and cis-1-chlorobuta-1,3-diene in a particular amount, can improve crystallization resistance efficiently and reliably. As a result, the vulcanizate produced from the chloroprene rubber composition of the present embodiment shows excellent low-temperature properties reliably.

(Third Embodiment)

Hereinafter, the formed body in a third embodiment of the present invention will be described. The formed body of the present embodiment is a product obtained by vulcanizing the above-described chloroprene rubber composition of the first embodiment after or during forming. Typical examples of the formed bodies include boot members such as constant-velocity joint boots, ball joint boots, and rack & pinion boots; hose members such as oil hoses, fuel vapor hoses, air hoses, turbocharger hoses, power steering hoses, brake hoses, air conditioner hoses, and pressure hoses; engine mount antivibration rubbers, muffler hangers, bearing rubbers, air springs, sealing materials such as oil seals and O-rings, wiper blades, and the like.

The forming method is not particularly limited and, for example, press forming, injection molding, or extrusion molding may be used. For example when the formed body is a wiper blade or an antivibration material, such as an automobile or industrial antivibration rubber, it can be formed by press forming or injection molding.

The formed body of the present embodiment, which uses the above-described chloroprene rubber of the first embodiment, can improve the crystallization resistance more efficiently and reliably than before. It is possible, as a result, to improve the low-temperature properties such as compression set at low temperature and obtain the favorable low-temperature properties reliably.

EXAMPLES

Hereinafter, the advantageous effects of the present invention will be described more specifically with reference to the Examples and Comparative Examples of the present invention. In the following Examples, the chloroprene rubbers of Examples 1 to 4 and Comparative Examples 1 to 3 were prepared from the raw monomers in the compositions shown in the following Table 1 and the properties thereof were evaluated.

TABLE 1

| Monomer composition (mass %) | Example 1 | Example 2 | Example 3 | Example 4 | Comparative Example 1 | Comparative Example 2 | Comparative Example 3 |
|---|---|---|---|---|---|---|---|
| Chloroprene | 95.5 | 93.5 | 91 | 86.5 | 97 | 98.5 | 100 |
| Antiperiplanar trans-1-chlorobuta-1,3-diene | 1 | 1 | 1 | 1 | 0 | 1 | 0 |
| cis-1-Chlorobuta-1,3-diene | 0.5 | 0.5 | 0.5 | 0.5 | 0 | 0.5 | 0 |
| 2,3-Dichlorobuta-1,3-diene | 3 | 5 | 8 | 12 | 3 | 0 | 0 |

The compositions shown in the following Table 2 were prepared respectively from the chloroprene rubber of these Examples and Comparative Examples and the "hardness," "processing properties," "tensile strength", and "low temperature compression set" thereof were evaluated by the methods under the conditions shown below.

TABLE 2

| Component | | Blending amount (parts by mass) |
|---|---|---|
| Rubber component | Chloroprene rubber | 100 |
| Aging inhibitor | N-Phenyl-1-naphthylamine | 1 |
| Acid acceptor | MgO (#30) | 4 |
| Vulcanizing agent | ZnO (2 kinds) | 5 |
| Vulcanization accelerator | Ethylene thiourea | 0.37 |

(Hardness)
Test pieces were prepared according to JIS K6250 (vulcanization condition: 141° C. 25 minutes) and the hardness of each vulcanizate (vulcanized rubber) was determined according to JIS K6253.

(Processing Properties)
The scorch time of each chloroprene rubber composition in the composition shown in Table 2 above was determined at 125° C. according to JIS K6300.

(Tensile Strength)
Test pieces were prepared according to JIS K6250 (vulcanization condition: 141° C. 25 minutes) and the strength and the elongation of each vulcanizate (vulcanized rubber) were determined in the tensile test according to JIS K6253.

(Compression Set)
Each chloroprene rubber composition in the composition shown in Table 2 above was vulcanized at 141° C. for 35 minutes and the compression set of the vulcanizate was determined according to JIS K6262, as it is tested at a temperature of 0° C. for 70 hours.

The chloroprene rubber compositions in the compositions shown in the following Table 3 were prepared respectively from the chloroprene rubbers of Examples and Comparative Examples above and subjected to the Gehman torsion test.

TABLE 3

| Component | | Blending amount (parts by mass) |
|---|---|---|
| Rubber component | Chloroprene rubber | 100 |
| Processing aid | Stearic acid | 0.5 |
| Reinforcing material | Carbon black | 30 |
| Acid acceptor | MgO (#30) | 4 |
| Vulcanizing agent | ZnO (2 kinds) | 5 |
| Vulcanization accelerator | Ethylene thiourea | 0.37 |

(Gehman T10)
Each of the polychloroprene rubber compositions in the compositions shown in Table 3 above was vulcanized at 141° C. for 25 minutes and the vulcanizate was subjected to the Gehman torsion test according to JIS K6261. The temperature (T10) at which the 180° torsion modulus is 10 times larger than that at normal temperature was determined and the low-temperature properties of each polychloroprene rubber composition was evaluated, based on the value.

The results above are summarized in the following Table 4.

TABLE 4

| Test item | Example 1 | Example 2 | Example 3 | Example 4 | Comparative Example 1 | Comparative Example 2 | Comparative Example 3 |
|---|---|---|---|---|---|---|---|
| Hardness (Shore A) | 45 | 45 | 46 | 47 | 46 | 45 | 45 |
| Scorch time (minute) | 18.3 | 19 | 20.5 | 21.4 | 22.2 | 17.7 | 18.6 |
| Tensile strength (MPa) | 17.6 | 17.3 | 16.8 | 16.3 | 17.5 | 18 | 17.7 |
| Elongation (%) | 1110 | 1150 | 1170 | 1220 | 1220 | 1100 | 1110 |

TABLE 4-continued

| Test item | Example 1 | Example 2 | Example 3 | Example 4 | Comparative Example 1 | Comparative Example 2 | Comparative Example 3 |
|---|---|---|---|---|---|---|---|
| Low-temperature compression set (%) | 46 | 43 | 39 | 35 | 65 | 83 | 99 |
| Gehman T10 (° C.) | −36.1 | −35.5 | −34.6 | −33.5 | −36.2 | −37.1 | −36.9 |

As shown in Table 4 above, the chloroprene rubber of Comparative Example 1, which was prepared by emulsion polymerization of raw monomers containing 2,3-dichlorobuta-1,3-diene but not containing antiperiplanar trans-1-chlorobuta-1,3-diene or cis-1-chlorobuta-1,3-diene, was inferior in low-temperature compression set. Alternatively, the chloroprene rubber of Comparative Example 2, which was prepared by emulsion polymerization of raw monomers not containing 2,3-dichlorobuta-1,3-diene nor antiperiplanar trans-1-chlorobuta-1,3-diene, and the chloroprene rubber of Comparative Example 3, which was prepared by emulsion polymerization of chloroprene alone, were also inferior in low-temperature compression set.

In contrast, the chloroprene rubbers of Examples 1 to 4, which were prepared by emulsion polymerization of raw monomers containing antiperiplanar trans-1-chlorobuta-1,3-diene and cis-1-chlorobuta-1,3-diene in a total amount of 0.5 mass % or more and 2,3-dichlorobuta-1,3-diene in an amount of 2.0 mass % or more, were superior in low temperature compression set and sufficiently favorable in processability and mechanical properties.

The results above demonstrate that it is possible according to the present invention to obtain a chloroprene rubber superior in low-temperature properties.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A chloroprene rubber obtained by emulsion polymerization of raw monomer containing antiperiplanar trans-1-chlorobuta-1,3-diene and cis-1-chlorobuta-1,3-diene in a total amount of 1.5 to 5 mass %, 2,3-dichlorobuta-1,3-diene in an amount of 2.0 to 20 mass % and 2-chloro-1,3-butadiene.

2. A chloroprene rubber composition comprising the chloroprene rubber according to claim 1.

3. A vulcanizate obtained by vulcanizing the chloroprene rubber composition according to claim 2.

4. A formed body obtained by vulcanizing the chloroprene rubber composition according to claim 2 after or during forming.

5. The formed body according to claim 4, characterized by being a boot member, a hose member, a bearing rubber, a sealing material, or a wiper blade.

6. A method for producing a chloroprene rubber, comprising emulsion-polymerizing raw monomer containing antiperiplanar trans-1-chlorobuta-1,3-diene and cis-1-chlorobuta-1,3-diene in a total amount of 1.5 to 5 mass %, and 2,3-dichlorobuta-1,3-diene in an amount of 2.0 to 20 mass % and 2-chloro-1,3-butadiene.

* * * * *